United States Patent [19]

Lentz et al.

[11] Patent Number: 5,060,840
[45] Date of Patent: Oct. 29, 1991

[54] APPARATUS FOR CONVEYING ROUNDED CAN BODY BLANKS TO A WELDING UNIT

[75] Inventors: Norbert Lentz, Essen; Harald Schmidt, Langerwehe, both of Fed. Rep. of Germany

[73] Assignee: Krupp Maschinentechnik GmbH, Essen, Fed. Rep. of Germany

[21] Appl. No.: 589,632

[22] Filed: Sep. 28, 1990

[30] Foreign Application Priority Data

Sep. 29, 1989 [DE] Fed. Rep. of Germany ....... 3932551

[51] Int. Cl.$^5$ .................... B23K 37/04; B21D 43/06; B65G 19/22
[52] U.S. Cl. .......................................... 228/47; 219/64
[58] Field of Search ................. 228/47, 151, 17.5; 219/64, 79

[56] References Cited

U.S. PATENT DOCUMENTS

| 2,846,972 | 8/1958 | Bofinger | 228/47 |
| 3,255,945 | 6/1966 | Sillars | 228/47 |
| 4,162,382 | 7/1979 | Schalch | 219/64 |
| 4,741,468 | 3/1988 | Weil et al. | 219/64 |
| 4,774,391 | 9/1988 | Weil | 219/64 |

FOREIGN PATENT DOCUMENTS

| 2820188 | 12/1978 | Fed. Rep. of Germany . |
| 3615706 | 1/1988 | Fed. Rep. of Germany . |
| 3736002 | 11/1988 | Fed. Rep. of Germany . |
| 3720804 | 1/1989 | Fed. Rep. of Germany . |
| 55293 | 5/1967 | German Democratic Rep. . |

Primary Examiner—Samuel M. Heinrich
Attorney, Agent, or Firm—Spencer & Frank

[57] ABSTRACT

A conveying apparatus feeds can body blanks to a welding unit with the longitudinal edges of the can body blanks even, without being offset in the longitudinal direction. The apparatus includes a centrally disposed revolving device (5; 5'; 5") which serves as a transport unit for the can body blanks (1). Rockers (18) are connected by means of swivel axes (5b) to serve as pusher dogs. Each rocker (18) has two feed pins (18c, 18d) at its front end facing the direction of transport. In the pushing position, the feed pins simultaneously contact the rear edge of a can body blank (1) on either side of the longitudinal edges. Each of the rocker arms is provided with a control arm which extends past the swiveling axis and which has a control surface.

17 Claims, 6 Drawing Sheets

APPARATUS FOR CONVEYING ROUNDED CAN BODY BLANKS TO A WELDING UNIT

CROSS REFERENCE TO RELATED APPLICATION

This application claims the priority of application Ser. No. P 39 32 551.2, filed on Sept. 29th, 1989 in the Federal Republic of Germany, the subject matter of which is incorporated herein by reference.

BACKGROUND OF THE INVENTION

The present invention relates to an apparatus for feeding rounded can body blanks to a welding unit which welds the longitudinal edges of the can body blanks to provide longitudinal seams.

U.S. Pat. No. 4,162,382 discloses an apparatus which employs a welding unit having an arm which extends in the direction of transport of the blanks and a rail with longitudinal grooves which guide the longitudinal edges of the blanks. A revolving transport unit, which is supported above the can body blanks, has pusher dogs that are mounted for movement about swivel axes disposed transversely to the direction of transport. The pusher dogs are oriented by a control surface on a guide track facing the transport unit. The pusher dogs are evenly distributed over the periphery of the transport unit and are provided with pusher surfaces which run perpendicular to the direction of transport. These pusher surfaces must be brought into contact with the rear ends of the can body blanks during entry into the section of the transport unit having the pusher dogs. The guide track is designed in such a way, on the side corresponding to the pusher dog section, the pusher dog surfaces temporarily retain their positions perpendicular to the direction of transport, even during their withdrawal from the pusher dog section of the transport unit.

In U.S. Pat. No. 4,162,382, the transport unit comprises two endless chains which are disposed parallel to one another. The pusher dogs are designed as levers and are disposed at a distance from one another that is less than the length of the can body blanks in the direction of transport.

For further treatment of the can body blanks it is of crucial importance that the pusher dogs of both endless chains be located in pairs opposite one another in a plane, which is aligned precisely at right angles with respect to the endless chains. Only then is it possible to weld the longitudinal edges of the can body blanks together without an offset, with the result that the front and rear ends of the can body blanks are disposed on exact perpendicular planes in relation to the longitudinal axes of the can body blanks so that the tops and bottoms can subsequently be attached tightly and without any problem. In the embodiment under discussion, the positions of the two endless chains may be affected by means of continuous adjustment of the couplings in such a way that the pusher dogs, which come in pairs, are disposed precisely opposite from one another in the region of the chain wheels. However, this does not ensure that the can body blanks in the effective region of the welding unit reach a condition in which their longitudinal edges connect without being offset longitudinally. It is not really possible to totally avoid irregularities in the distance between consecutive pusher dogs of each endless chain, due to manufacturing tolerances and/or due to various expansions during operation. Even if this type of discrepancy in distance is merely on the order of magnitude of a few tenths of a millimeter, further manufacturing operations on the welded body blanks may only be possible at an increased use of material, or the welded body blanks may even be unusable.

U.S. Pat. No. 4,774,391 proposes an apparatus which brings the endless chains that are equipped with the pusher dogs into alignment by means of adjustment templates at the point at which the front ends of the can body blanks enter the region of the welding unit. However, even in this embodiment, offsets due, for example, to wear on the endless chains or the adjustment templates, cannot be excluded. One further disadvantage which results from the use of adjustment templates is that the can body blanks can only be moved in accordance with the division of the chains. This means that it is not possible to feed the can body blanks at the desired minimal distance (preferably, one millimeter at most) into the effective range of the welding unit, so that the welding speed which the welding unit is capable of cannot be converted into the longest possible length of welding seams.

SUMMARY OF THE INVENTION

It is the object of the invention to provide an apparatus of the type mentioned above which permits the can body blanks to be fed at a high rate, without offset, to a welding unit, preferably a laser welding unit.

Another object is to provide an apparatus which permits the successive can body blanks to approach one another closely, i.e, they are preferably spaced from one another at a distance on the order of less than one millimeter.

These objects can be attained by feeding rounded can body blanks to a welding unit using a conveying apparatus which is characterized in that the pusher dogs and their pusher dog surfaces which engage laterally are made of one piece; in that the transport unit comprises only one revolving device; in that the pusher dogs, whose mutual distance is greater than the length of a can body blank in the direction of transport, are designed as rockers which are connected to the revolving device by means of swiveling axes; in that each rocker is provided on the forward side in the direction of transport with two feed pins, which are separated by a distance that is greater than the width of the track and which, in the pushing position, are disposed on both sides adjacent to the longitudinal edges of a can body blank and simultaneously press against the can body blank; and in that each rocker is provided with a control arm projecting over the swiveling axis, to which a control surface is attached.

A primary feature of the conveying apparatus of the present invention, which is basically different from the prior art, is that the transport unit is constructed of only one revolving device and the pusher dogs are each designed as a one-piece rocker, with the front of each rocker in the direction of transport being provided with two feed pins that serve as pusher dog surfaces. These feed pins engage the can body blank adjacent the longitudinal edges and are able to push the can body blank under consideration bilaterally (i.e., the left and the right). Each of the rockers may be provided with a control arm that extends past the pivoting axis of the rocker and which has a control surface that engages the guide track. In this respect, the invention is based on the recognition that the total of the tolerances between the feed pins of the pusher dogs must be zero, so that the pusher dogs must be attached to a possibly uniformly revolving device and so that only one centrally arranged revolving device must be used, in order for the deviations and errors mentioned above not to result in alignment errors.

Since the feed pins that engage the right and left sides of the can body blank are parts of one and the same rocker, a relative offset between the two feed pins and thus a longitudinal offset of the longitudinal edges of the can body blank can only occur if the pusher dog rocker is able to move about a vertical axis that is perpendicular to the direction of transport. This can be prevented by attaching the pusher dog rockers to a transport device which is rigid in the direction of transport in such a manner that they cannot rotate about a vertical axis, or by sliding the pusher dog rockers along an additional longitudinal guide element. A possible change in dimension caused by wear and/or stretching of the revolving device merely affects the mutual distance of the feed pins, but does not result in offsetting the pusher dogs in relation to one another.

The revolving device is preferably designed in such a way that under its influence each can body blank is pushed in the direction of transport far enough for a portion of the longitudinal seam to be welded, preferably having a length of up to several millimeters.

The pusher dog section of the revolving device should, in regard to the position of the welding unit, be so dimensioned that the length of the longitudinal seams produced is between 1 to 3 mm prior to the release of the feed pins from the can body blank in question.

Furthermore, the rocker has an angular design when seen from the side, and a U-shaped design when seen from the top. The distance between the feed pins may be less than the distance between the rocker arms.

If the device according to the invention is provided with feed chain drives having pusher dog teeth which project laterally into the region of the walls of the can body blanks, then the revolving device may be adjusted with respect to the feed chain drives by means of a shifting unit. Such an adjustment is conducted in such a way that the rockers opposite the associated pusher dog teeth, which move in the same direction, have an advance on the order of up to several millimeters, preferably between 1 to 2 mm. For example, the advance can be brought about using a continuously adjustable coupling. The result of the advance is that the can body blank is displaced from the pusher dog teeth of the chain drives. The design of the feed chain drives, which are advisably disposed at the right and the left and at the height of the longitudinal axis or the transverse plane of the can body blanks, is known, for example, from German patent 3,615,706.

Within the scope of the invention, the lateral feed chain drives may be designed in such a way that they extend in the direction of transport adjacent the welding unit and the revolving unit. In this case, the pusher dog section of the feed chain drive is considerably longer than that of the centrally arranged revolving device.

The feed chain drives, however, may also be arranged in such a way that their rearward end section (in the opposite direction from the direction of transport) is disposed in the discharge region of the revolving device. In this case, the feed chain drives merely serve to transport the can body blanks away from the welding unit and to a further, possibly connecting, work station (for example, a seam lacquering unit).

Two consecutive pairs of friction rollers may also be used, with the upper rollers of the pairs being driven. The first pair of friction rollers is disposed in front of the welding unit and the second friction roller pair is disposed behind it. The upper roller of the first pair of friction rollers is provided with a roller clutch.

The speed of the rockers in the direction of transport, relative to the revolving speed of the friction rollers, should be greater by approximately the percentage by which the distance between the rockers exceeds the length of the can body blanks in the direction of transport. When a rocker approaches the end of the pusher dog section, the speed of the can body blank which it is pushing decreases slightly due to the configuration of a control region on the guide track. The can body blank slows to the welding speed, corresponding to the revolving speed of the rollers, by the time its front end reaches a transfer point behind the effective region of the welding unit (i.e., after a longitudinal seam on the order of up to several millimeters has been welded).

One embodiment of the invention is characterized in that the revolving device is designed as an endless chain with bearing blocks on which the rockers are supported by means of their arms. The endless chain may, in particular, be a flat-link articulated chain or roller chain which, in a prior art manner, is supported by at least one drive wheel and a tension wheel. However, one may also consider using a steel band or the like.

A rotating disk on which the rockers are supported via their arms may also be used as the revolving device. The diameter of this disk is selected so that only one rocker at a time performs a very short, corresponding advance movement in the direction of transport.

A revolving device in the form of a flexible elastic strap, in combination with a parallel guide for the rockers, is also possible.

DESCRIPTION OF THE PREFERRED EMBODIMENTS

Figure 1:
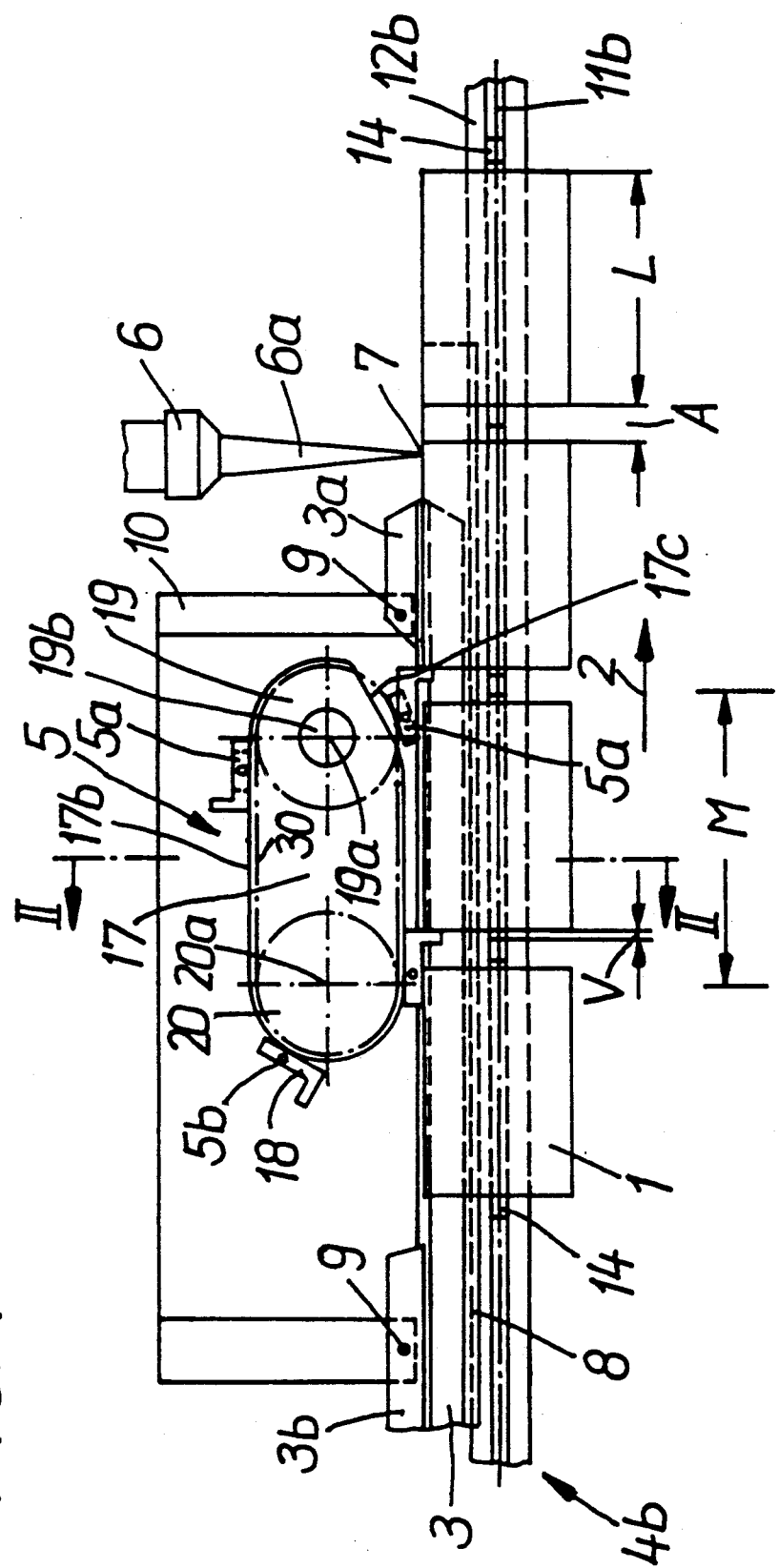
FIG. 1 is a side view of a portion of a can body welding machine having an apparatus for conveying rounded can body blanks, a welding unit, and laterally arranged feed chain drives.
Figure 2:
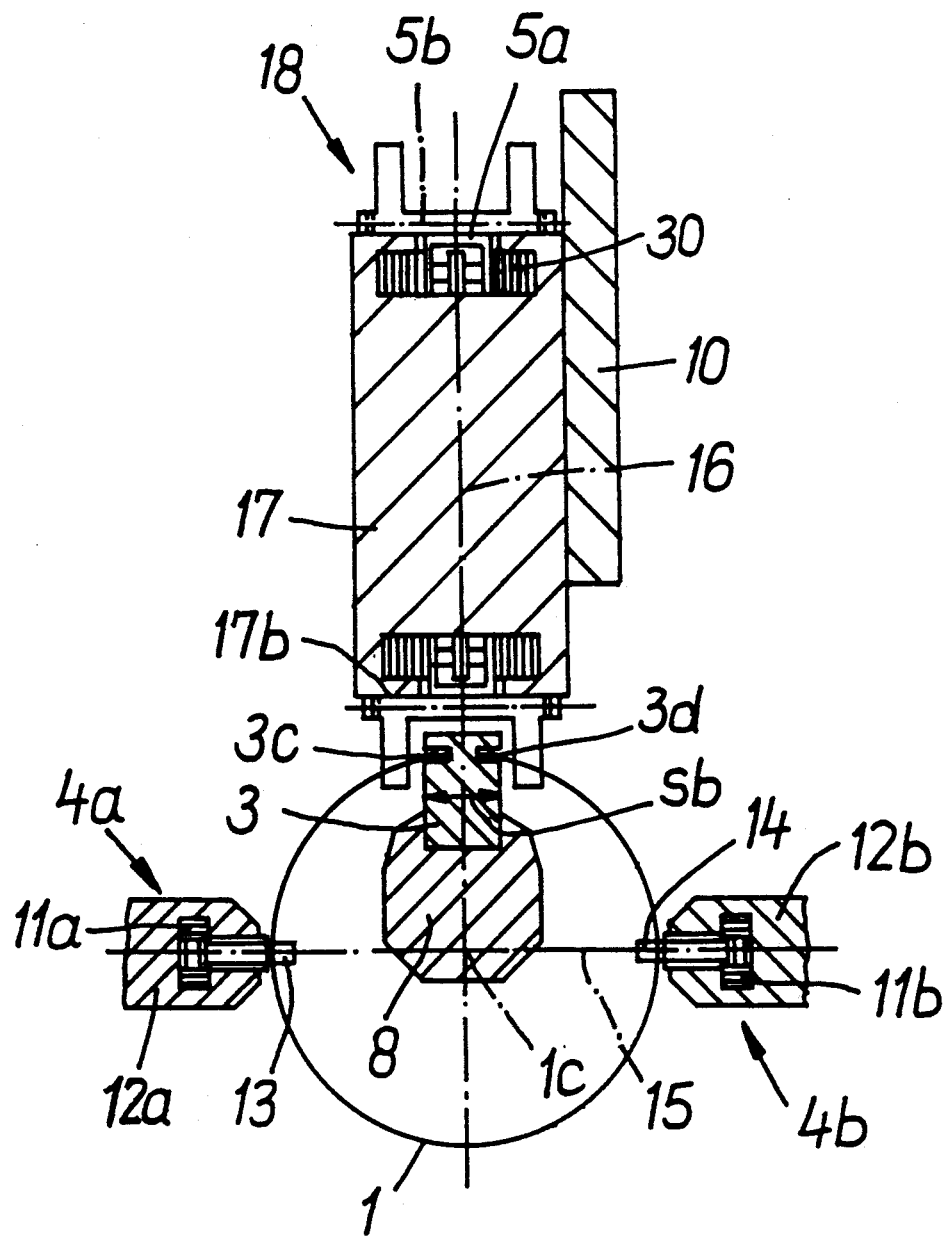
FIG. 2 is a sectional view taken along line II—II of FIG. 1, on a larger scale compared to FIG. 1.

The purpose of the can welding machine shown partially in FIG. 1 is to transport and feed can body blanks 1, which were produced and rounded in a prior work step. Can body blanks 1 move in the direction of transport (arrow 2), from left to right in FIG. 1. Can body blanks 1 have lateral edges 1a and 1b (FIG. 3) which fit into longitudinal grooves 3c and 3d of a rail 3 (FIG. 2). Can body blanks 1 are moved in the direction of transport by two feed chain drive mechanisms 4a and 4b (see also FIG. 2) into a pusher dog section (identified by the longitudinal dimension M) of a revolving device 5. Here "revolving" is used not in the sense of circular motion, but in the sense of circulation in a given direction along a closed path. Revolving device 5 feeds the can body blanks 1 into the effective range of a welding unit 6. Welding unit 6 emits a focused laser beam 6a to weld a longitudinal seam 7, which combines the longitudinal edges 1a and 1b of the can body blanks 1 in a manner known per se. Subsequent to the welding process, the can body blank 1 in question is again engaged by the feed chain drive mechanisms 4a and 4b and is conveyed in the direction of transport (arrow 2) for further processing, for example, to a seam lacquering apparatus which is not shown.

Rail 3 is attached to the upper side of a support arm 8 of longer design. At its front, seen from the direction of transport, rail 3 is provided with a metal bracket 3a in the region between the welding unit 6 and the revolving device 5. Similarly, at its back rail 3 is provided with a metal bracket 3b. Brackets 3a and 3b are connected to a frame 10 by means of detachable connections 9. In the embodiment shown the rail 3 is designed for butt joint welding, i.e., the two longitudinal grooves 3c and 3d (FIG. 2) are provided on the portion of rail 3 adjacent the revolving device 5 and the two longitudinal grooves 3c and 3d are disposed at equal heights opposite one another. As has previously been mentioned, the longitudinal edges 1a and 1b (FIG. 3) of can body blank 1 engage the grooves 3c and 3d to support the can body blank 1 displaceably in the direction of transport.

With reference to FIGS. 1 and 2, the feed chain drive mechanism 4a comprises an endless roller chain 11a which circulates in a stationary guide cage 12a. Similarly, feed chain drive mechanism 4b comprises an endless roller chain 11b which circulates in a stationary guide cage 12b. Roller chains 11a and 11b are positioned outside the diameter of the can body blank 1 diameter and are provided at regular distances with pusher dog teeth 13 and 14. Pusher dog teeth 13 and 14 project toward the longitudinal axes 1c of the can body blanks 1 in the region of the feed section of the feed chain drive mechanisms 4a and 4b. Pusher dog teeth 13 and 14 engage the can body blanks 1 in question, if appropriate, and advance them. The guide cages 12a and 12b are aligned in such a way that they face each other in a transverse plane at the level of the longitudinal axis 1c; this transverse plane extends perpendicular to a longitudinal center plane 16 through rail 3 and the longitudinal axis 1c.

Figure 3:
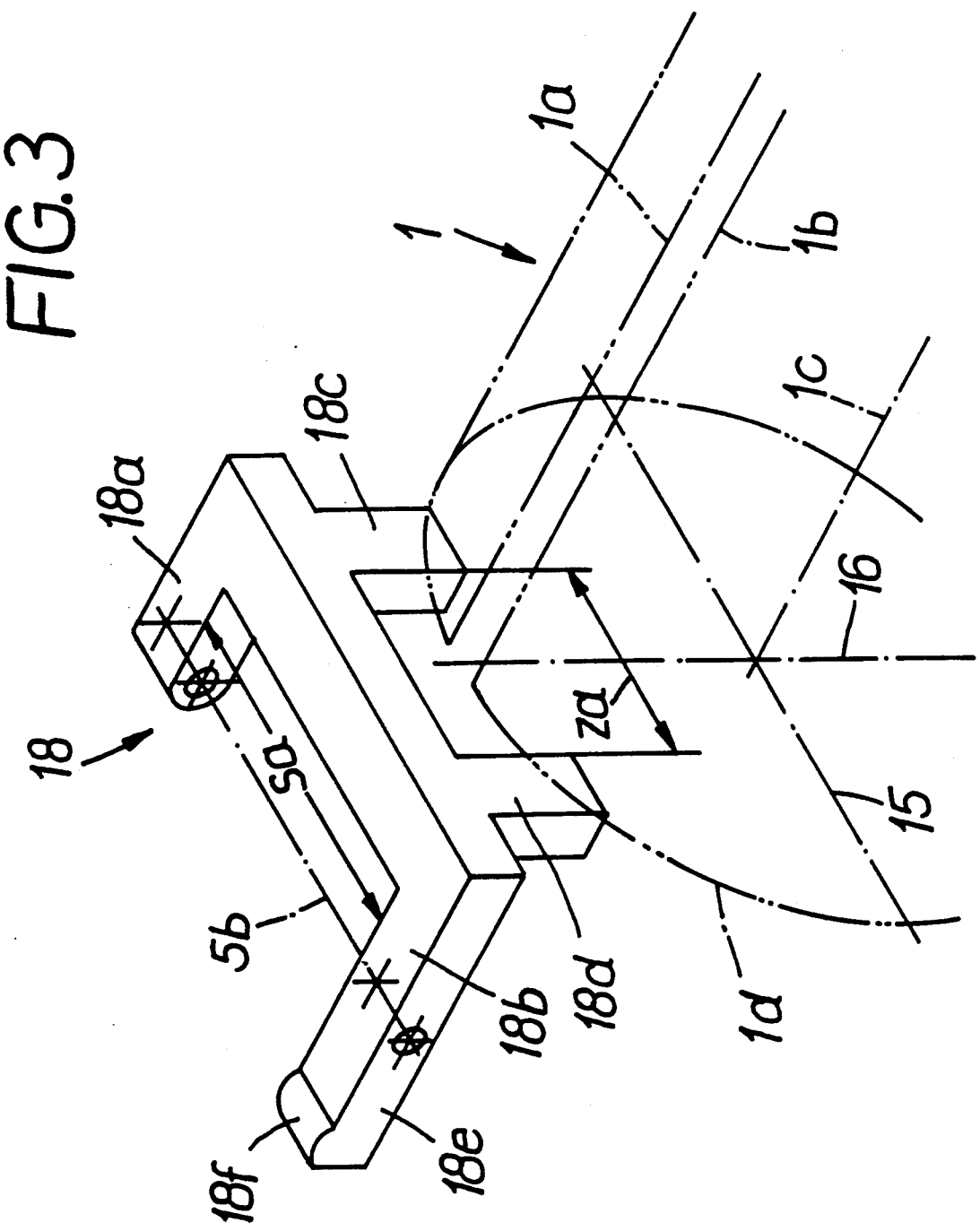
FIG. 3 is a perspective view showing the construction of a pusher dog designed as rocker, in cooperation with a can body blank.

In contrast to the prior art, a single transport unit is provided for the exact alignment and feeding of the can body blanks 1 into the effective range of the welding unit 6, namely, the revolving device. In the embodiment of FIGS. 1-3, the revolving device is identified by reference number 5 and includes a smoothly revolving endless roller chain 30, which circulates at a distance above the rail 3 in a support 17. Support 17 is mounted on the frame 10, and its longitudinal center plane corresponds with longitudinal center plane 16.

Figure 5:
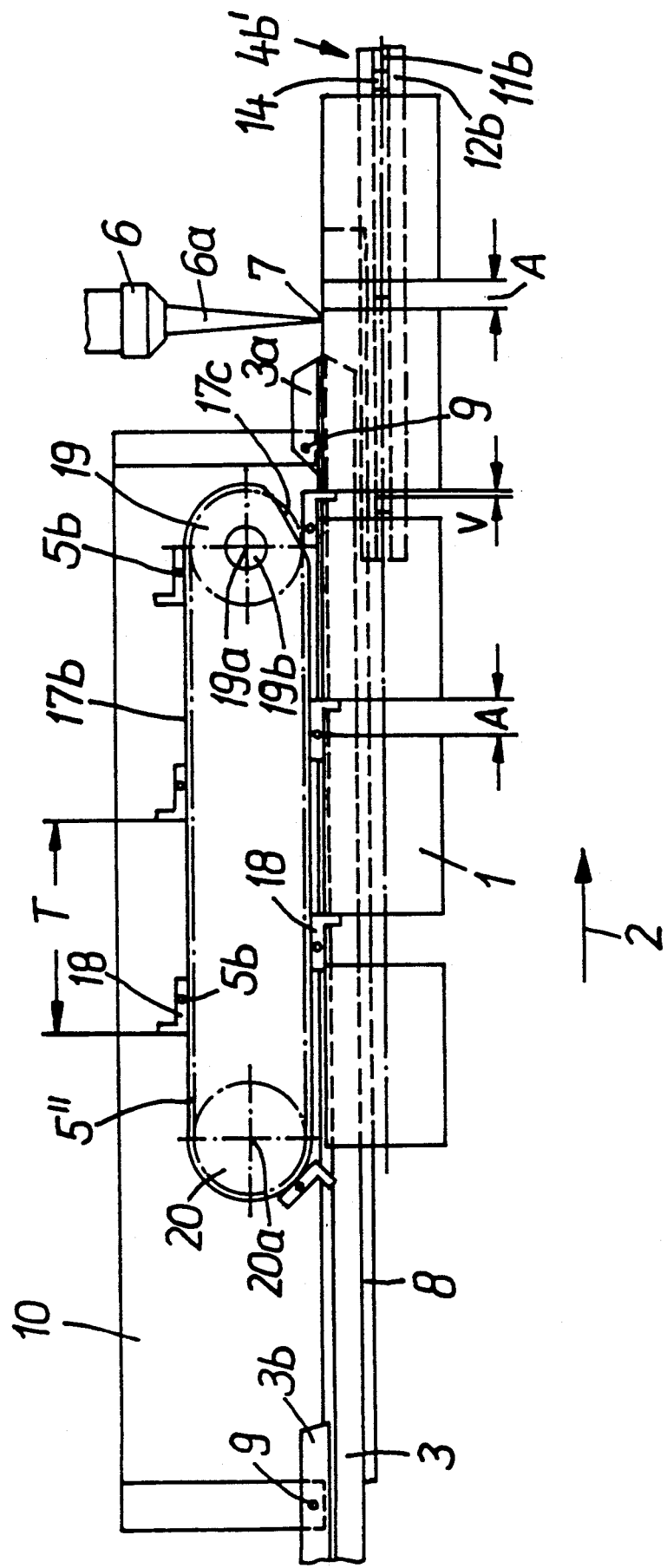
FIG. 5 is a side view of a portion of a further can welding machine, which is provided with a revolving device of particularly long design and lateral feed chain drives disposed only in the region of the welding unit.

The roller chain 30 is provided at regular distances (the same as shown by the segment designated T in the embodiment shown in FIG. 5) with bearing blocks 5a. Rockers 18 are held by bearing blocks 5a so as to be movable about swiveling axes 5b. When seen from the top rockers 18 are generally U-shaped, and have arms 18a and 18b which extend opposite the direction of transport when the rockers 18 are in their pushing position (that is, the position shown in FIG. 3). At its front end facing the direction of transport, each rocker 18 is provided with two feed pins 18c and 18d which provide pusher dog surface. The distance za between feed pins 18d and 18c is greater than the width sb of the rail (see FIG. 2) and smaller than the distance sa between arms 18a and 18b.

The feed pins 18c and 18d are perpendicular with respect to the arms 18a and 18b, so that the rocker 18 is of an angular design from a lateral perspective.

As FIG. 3 shows, the length of the feed pins 18c and 18d is such that, in the pushing position, they engage the back edge 1d of a can body blank 1 which is to be transported on both sides of the longitudinal edges 1a and 1b. Due to the fact that the feed pins 18c and 18d are part of a rigid component that provides a one-piece pusher dog which is effective on both sides of the longitudinal edges 1a and 1b, the can body blanks 1 are conveyed to the welding unit 6 with the longitudinal edges 1a and 1b adjacent to each other without longitudinal offset. The use of the rockers 18 also ensures that, for example, the plane determined by the back edge 1d of a can body blank 1 remains disposed precisely perpendicular to the longitudinal axis 1c during the feeding process.

The rocker arm 18b is provided with a control arm 18e which projects beyond the swivel axis 5b and which has a rounded control surface 18f. Furthermore, as shown in FIG. 2 a guide track 17b is provided on the exterior of support 17. As rocker 18 is moved along guide track 17b the control surface 18f engages guide track 17b, and as a consequence, the desired alignment of the rocker 18 is achieved.

Returning to FIG. 1, the roller chain 30 extends around a drive wheel 19 and a tensioning wheel 20, which rotate counter-clockwise about stationary axes 19a and 20a. The drive wheel 19 is connected to a drive unit (not shown) by means of a continuously adjustable coupling 19b. On the discharge side, i.e., in the region of the drive wheel 19, the guide track 17b is provided with a diagonally extending, approximately straight-lined discharge section 17c. Discharge section 17c is configured in such a way that, when roller chain 30 moves around the drive wheel 19, rockers 18 remain in their pushing position via a limited rotational angle. That is, the feed pins 18c and 1d (FIG. 3) remain perpendicular briefly as the rockers 18 pivot about their swivel axes 5b.

With continuing reference to FIG. 1, the distance between consecutive rockers 18 is the same as the distance between consecutive pusher dog teeth 14 (or between consecutive pusher dog teeth 13). This distance is composed of the length L of the can body blanks 1 and the space A between can body blanks 1. Activation of the coupling 19b allows the position of the rockers 18 in relation to pusher dog teeth 13 and 14 (FIG. 2) to be changed in such a way that the rockers 18 undergo a forward movement V on the order of magnitude of two millimeters.

The consequence of this measure is that the can body blanks 1 in the region of the pusher dog section M contact the rockers 18 and result in the desired exact alignment without alignment error.

At the approach of the rockers 18 to the drive wheel 19, the transport speed is reduced under the influence of discharge section 17c, so that the advance movement V is lost and pusher dog teeth 13 and 14 again come into contact with the back end of the can body blank 1 in question.

According to the invention, pusher dog section M is dimensioned and disposed in such a way that the can body blanks 1 are released from the rockers 18 and transported further by the pusher dog teeth 13 and 14 after a longitudinal seam 7 of about three millimeters has been produced by the laser beam 6a. This ensures that the exact alignment provided by rockers 18 remains in effect until the longitudinal seam 7 is completed to prevent the formation of an undesirable offset between the longitudinal edges 1a and 1b of the can body blank 1.

Figure 4:
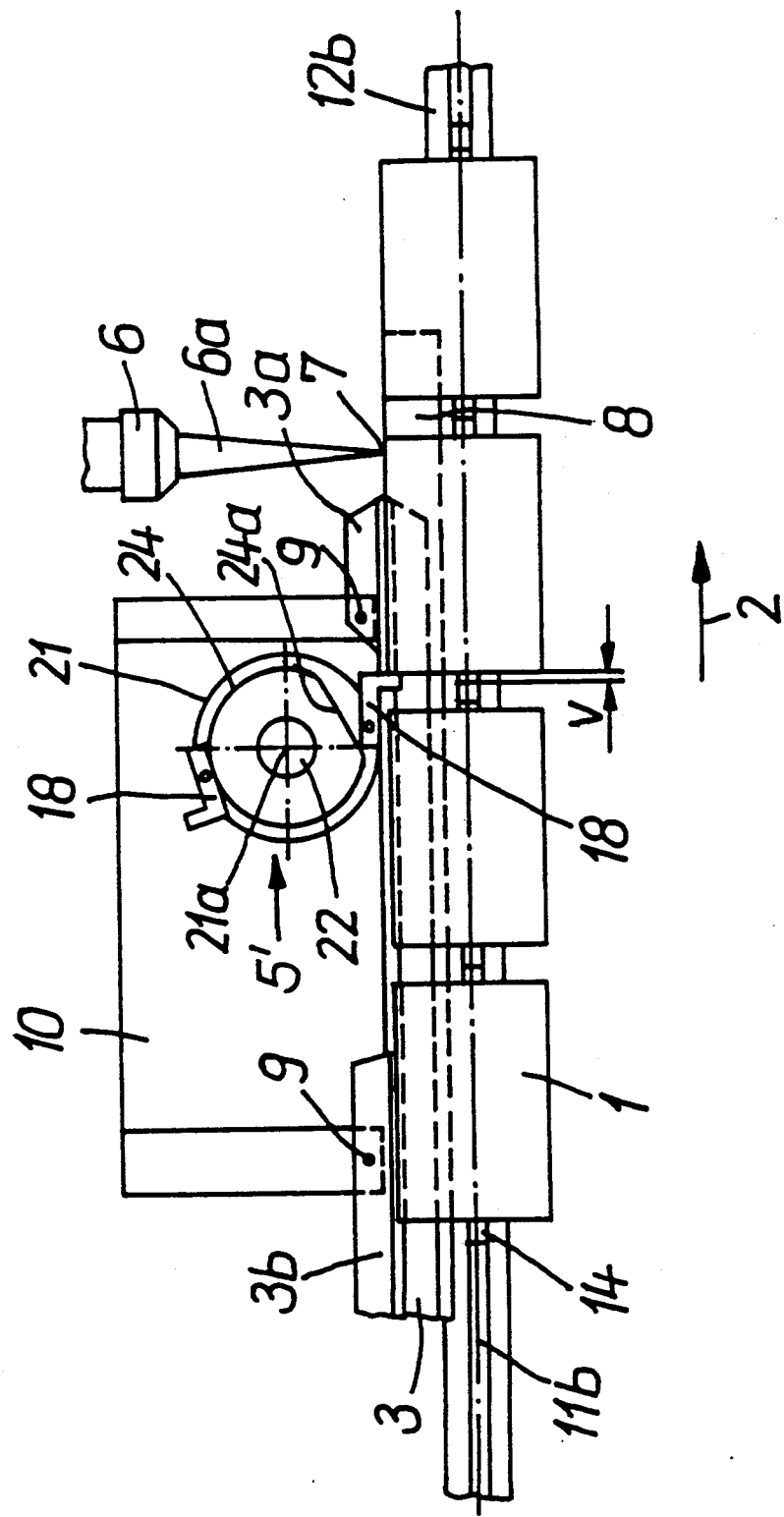
FIG. 4 is a side view of a portion of another can welding machine, which is provided with a conveying apparatus having a rotating disk as the revolving device.

In the embodiment shown in FIG. 4, the revolving device 5' is disposed above rail 3 and comprises a disk 21. Disk 21 is connected to a drive mechanism (not shown) via intermediate shifting of a continuously adjustable coupling 22, and rotates counterclockwise about a stationary axis 21a. In contrast to the embodiment of FIGS. 1–3, two rockers 18 are pivotably mounted on the disk 21. In the manner already described, these rockers 18 are aligned by means of support on the guide track 24. Guide track 24 is provided on the side facing the welding unit 6 with a diagonally extending, approximately straight lined discharge section 24a.

The distance between the rockers 18, which are offset by a 180° angle, corresponds to the distance between the pusher dog teeth 14 (or between the pusher dog teeth 14; see FIG. 2).

The operation of the embodiment of FIG. 4 corresponds for the rest with that of the embodiment of FIGS. 1–3, with the added difference that only one of the two rockers 18 is in contact with a can body blank 1. The single rocker 18 transports the can body blank 1 far enough into the effective region of the welding unit 6 that it is able to produce a longitudinal seam 7 having a length on the order of magnitude of several millimeters.

The embodiment according to FIG. 5 is only different in two respects from that of FIGS. 1–3:

The revolving device 5" comprises a roller chain that is considerably longer than roller chain 30 of the first embodiment. Accordingly, seven rockers 18 are employed, three of which are in contact with successive can body blanks 1.

Additionally, the laterally arranged feed chain drive, mechanisms (for example feed chain drive mechanism 4b', which is shown in FIG. 4) are arranged in such a way in the direction of transport (arrow 2) that they extend beyond the effective region of the welding unit 6, and the rear ends of the feed chain drive mechanisms coincide with the discharge region of the revolving device 5". At the discharge region, the rockers 18 are separated from the can body blanks 1 in question under the influence of discharge section 17c.

Due to its greater longitudinal extension, the revolving device 5" with its rockers 18 may take on transport tasks as well. The dislocation of the feed chain drive mechanisms to the right in FIG. 5 permits a shorter design, other operational conditions remaining the same.

Figure 6:
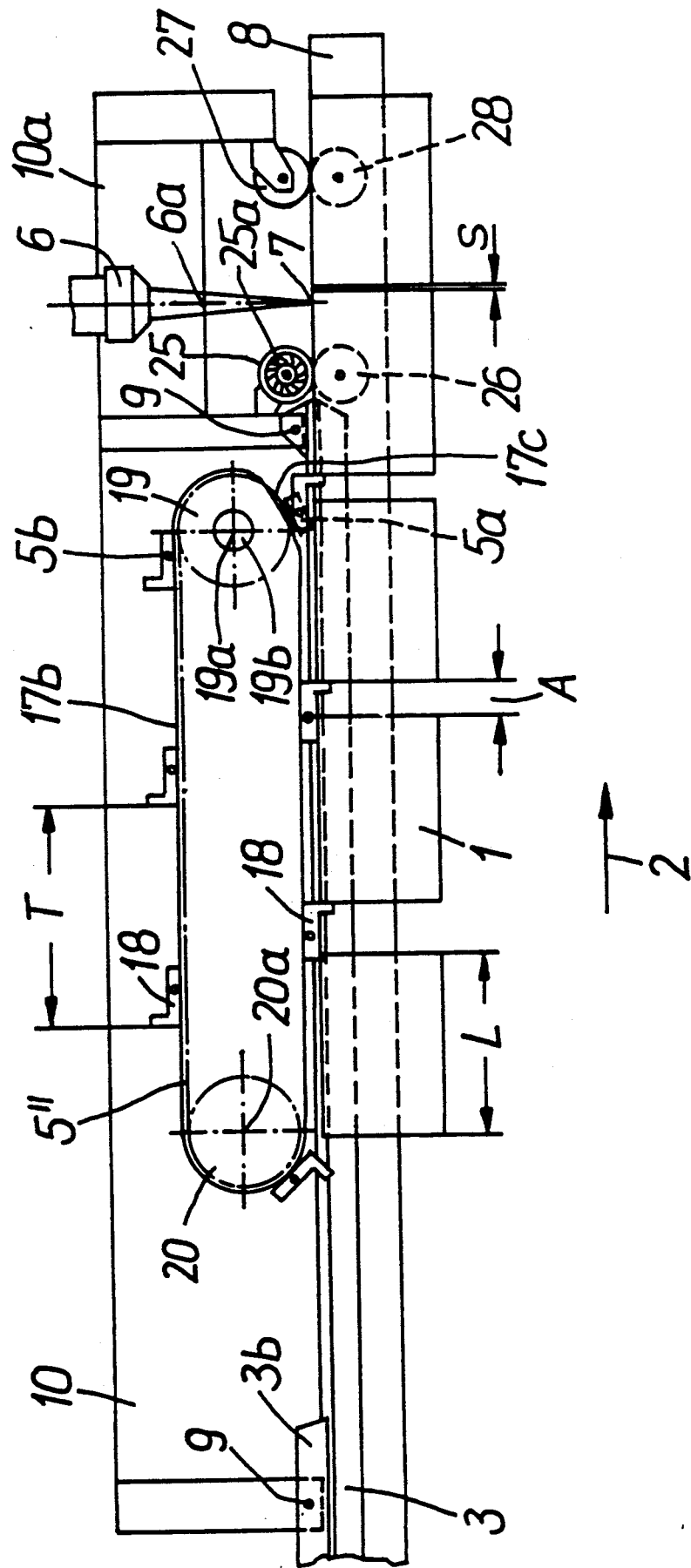
FIG. 6 is a side view of a portion of an additional can welding machine, which is provided with a revolving device and, in the region of the welding unit, with pairs of friction rollers.

The embodiment according to FIG. 6 is essentially only different from the embodiment of FIG. 5 in that the lateral feed chain drive mechanisms are replaced by two pairs of friction rollers 25, 26, and 27, 28. Upper rollers 25 and 27, which are driven, are disposed in front of and behind the welding unit 6—seen in the direction of transport (arrow 2). The upper roller 25 is also equipped with a continuously adjustable coupling 25a, which makes it possible to adopt the circumferential velocity of the first pair of friction rollers 25 and 26 to the changing transport speed of the can body blanks 1 during the transport movement. The upper roller 27 of the second roller pair is attached to an extension 10a of the frame 10, and the lower rollers 26 and 28 are rotatably disposed at the support arm 8.

According to the invention, the speed of the rockers 18 in the direction of transport is greater than the circumferential velocity of the friction rollers 25–28 by approximately the percentage by which the distance T between rockers 18 exceeds the length L of the can body blanks 1. The circumferential velocity of the friction rollers 25–28 is adapted to the welding speed.

Due to this type of arrangement of the interacting drive components (the roller chain of revolving device 5" and friction roller pairs 25, 26, 27 and 28) it is possible to reduce the distance A between can body blanks 1 to a minimal value S (on the order of magnitude of less than 1 mm) in the effective region of the welding unit 6.

The advantage gained by this is that, given the welding speed that is available, the greatest possible welded seam length can be produced and the greatest possible throughput of can body blanks 1 can be attained.

The advantage gained with this invention consists particularly in that the, feed movement of the can body blanks 1 to be welded extends beyond the effective region of the welding unit 6 due to a centrally arranged revolving device whose rockers 18 and associated feed pins 18c and 18d are designed as one unit. The pusher dog section M, over whose length the can body blanks 1 are advanced by the rockers 18, can therefore be dimensioned in such a way that a longitudinal seam 7 has already been started prior to the release of the can body blanks 1 by the rockers 18. Moreover the longitudinal edges 1a and 1b of the can body blanks 1 reach the effective region of the welding unit 6 without being offset in the longitudinal direction.

Due to the design of the revolving device and the rockers, the advance movement of the can body blanks can be adjusted so that the distance between consecutive can body blanks can be reduced to a minimal value when they enter the effective region of the welding unit. The possible welding potential may thus be used to the greatest extent possible.

It will be understood that the above description of the present invention is susceptible to various modifications, changes, and adaptations, and the same are intended to be comprehended within the meaning and range of equivalents of the appended claims.

What we claim is:

1. An apparatus for conveying rounded can body blanks in a direction of transport to a welding unit, the blanks having front and rear edges and longitudinal edges between the front and rear edges, the welding unit connecting the longitudinal edges of the blanks with welded seams, said apparatus comprising:

a rail extending in the direction of transport, the rail having a predetermined width and having sides with longitudinal grooves to guide the longitudinal edges of the blanks; and transport unit means adjacent the rail for moving the blanks in the direction of transport, the transport unit means having a pusher dog section in which the transport unit means comes into contact with the blanks, the transport unit means including a single revolving device having a periphery, a plurality of rocker elements, each having two feed pins which are connected to one another via the respective rocker element and which are spaced apart by a distance greater than the width of the rail, each feed pin having a pusher dog surface for engagement with the rear edges of the blanks, each rocker element additionally having a control arm with a control surface, means for mounting the rocker elements on the revolving device so that the rocker elements are movable about respective swiveling axes that are transverse to the direction of transport, the rocker elements being uniformly distributed about the periphery of the revolving device at positions such that the distance between the pusher dog surfaces of one rocker element and the pusher dog surfaces of an adjacent rocker element is greater than the length of a can body blank, and a guide track which is slidably engaged by the control surfaces of the rocker elements, wherein the transport unit means brings the pusher dog surfaces of the rocker elements into contact with the rear edges of the blanks during entry of the blanks into the pusher dog section of the transport unit means, with the pusher dog surfaces of a rocker element being disposed on both sides of the rail and simultaneously pushing against the rear edge of a blank adjacent the longitudinal edges of the respective blank, and wherein the guide track has a portion which is configured to support the rocker elements so that the pusher dog surfaces maintain a predetermined orientation with respect to the direction of travel as the rocker elements exit the pusher dog section of the transport unit means.

2. The apparatus of claim 1, wherein the revolving device is positioned with respect to the welding unit so that the transport unit means moves a blank far enough for a portion of the respective seam to be welded.

3. The apparatus of claim 1, wherein each rocker element has a side and an angular configuration when viewed from the side, each rocker element additionally having a top and a U-shaped configuration when viewed from the top while the respective rocker element is moving in the direction of travel, the U-shaped configuration including arms which point opposite the direction of travel.

4. The apparatus of claim 3, wherein the distance between the feed pins of a rocker element is smaller than the distance between the arms of the respective rocker element.

5. The apparatus of claim 1, further comprising a support arm which extends in the direction of travel, the rail being connected to the support arm, and feed chain drive mechanisms on both sides of the support arm, the feed chain drive mechanisms having pusher dog teeth which project to positions for engagement with the rear edges of the blanks, and wherein the transport unit means further comprises means for adjusting the revolving element in relation to the feed chain drive mechanisms so that the pusher dog surfaces of a rocker element corresponding to a pair of pusher dog teeth have a predetermined advance in the direction of transport, the means for adjusting including a shifting unit.

6. The apparatus of claim 5, wherein the predetermined advance is between about one millimeter and about two millimeters.

7. The apparatus of claim 5, wherein the feed chain drive mechanisms extend in the direction of transport and pass adjacent the welding unit and adjacent the revolving device.

8. The apparatus of claim 5, wherein the transport unit means has a discharge region where the rocker elements exit the pusher dog section of the transport section, wherein the feed chain drive mechanisms extend in the direction of transport and pass adjacent the welding unit, and wherein the feed chain drive mechanisms have rear end segments that are disposed in the discharge region of the transport unit means.

9. The apparatus of claim 1, further comprising first and second pairs of friction rollers to engage blanks moving in the direction of transport, each pair including a respective top roller that is driven, the pairs of rollers being disposed on opposite sides of the welding unit and the first pair of rollers being disposed between the transport unit means and the welding unit, and a continuously adjustable coupling for the driven roller of the first pair.

10. The apparatus of claim 9, wherein the velocity of the rocker elements in the direction of transport is larger than the circumferential velocity of the rollers by approximately the percentage that the distance between rocker elements exceeds the length of the blanks.

11. The apparatus of claim 1, wherein the revolving device comprises an endless chain, wherein the rocker elements have arms, and wherein the means for mounting the rocker elements on the revolving device comprises bearing blocks connected to the chain, the arms of the rocker elements being pivotably supported on the bearing blocks.

12. The apparatus of claim 1, wherein the revolving device comprises a rotating disk, wherein the rocker elements have arms, and wherein the means for mounting the rocker elements on the revolving device comprises means for pivotably connecting the arms to the disk.

13. The apparatus of claim 1, further comprising a support arm extending in the direction of travel, the rail being connected to the support arm.

14. The apparatus of claim 1, wherein the transport unit means is disposed above the can body blanks.

15. The apparatus of claim 1, wherein the pusher dog surfaces of the rocker elements are disposed approximately perpendicular to the direction of travel when the pusher dog surfaces are brought into contact with the rear edges of the blanks.

16. The apparatus of claim 1, wherein the predetermined orientation maintained by the pusher dog surfaces as the rocker elements exit the pusher dog section is approximately perpendicular to the direction of travel.

17. The apparatus of claim 1, wherein each rocker element has first and second ends, the feed pins being provided at the first end and the control surface being provided at the second end, and wherein the swivel axis for the respective rocker element is positioned between the first and second ends.

* * * * *